(12) United States Patent
Oya

(10) Patent No.: US 9,535,382 B2
(45) Date of Patent: Jan. 3, 2017

(54) IMAGE FORMING APPARATUS WITH ATTACHABLE/DETACHABLE DUPLEX UNIT, CONTROL METHOD THEREFOR, AND STORAGE MEDIUM

(71) Applicant: CANON KABUSHIKI KAISHA, Tokyo (JP)

(72) Inventor: Hiroshi Oya, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/832,137

(22) Filed: Aug. 21, 2015

(65) Prior Publication Data
US 2016/0054693 A1 Feb. 25, 2016

(30) Foreign Application Priority Data
Aug. 25, 2014 (JP) .................................. 2014-170570

(51) Int. Cl.
G06F 15/00 (2006.01)
G03G 15/23 (2006.01)
H04N 1/00 (2006.01)
G03G 21/16 (2006.01)

(52) U.S. Cl.
CPC ............ G03G 15/234 (2013.01); G03G 21/16 (2013.01); H04N 1/00538 (2013.01); H04N 1/00557 (2013.01); H04N 2201/0082 (2013.01)

(58) Field of Classification Search
CPC ...................... G03G 15/234; H04N 2201/0082; H04N 1/00557; H04N 1/00538
USPC ......................................................... 358/1.15
See application file for complete search history.

(56) References Cited

U.S. PATENT DOCUMENTS

2006/0262344 A1* 11/2006 Matsuda ............... G06F 3/1207
358/1.15
2010/0034544 A1* 2/2010 Kim ..................... G03G 15/234
399/21

FOREIGN PATENT DOCUMENTS

| JP | 2005169684 A | 6/2005 |
| JP | 2006035564 A | 2/2006 |
| JP | 2006192853 A | 7/2006 |
| JP | 2007101668 A | 4/2007 |

OTHER PUBLICATIONS

Office Action issued in Japanese Application No. JP2014-170570 mailed Jun. 21, 2016.

* cited by examiner

*Primary Examiner* — Saeid Ebrahimi Dehkord
(74) *Attorney, Agent, or Firm* — Rossi, Kimms & McDowell LLP

(57) ABSTRACT

An image forming apparatus which is capable of preventing printing from being performed with a duplex unit incompletely attached. The duplex unit is attachable to and detachable from the image forming apparatus. Execution of one-sided printing and double-sided printing by a printing unit is inhibited based on that a detection unit does not detect attachment of the duplex unit in a state where information to an effect that attachment of the duplex unit has been detected previously by the detection unit.

21 Claims, 7 Drawing Sheets

*FIG. 8*

| DUPLEX UNIT IS NOT ATTACHED |
|---|
| DUPLEX UNIT MAY NOT BE ATTACHED OR MAY NOT BE CORRECTLY ATTACHED. PLEASE CHECK CONNECTION OF DUPLEX UNIT. |

IMAGE FORMING APPARATUS WITH ATTACHABLE/DETACHABLE DUPLEX UNIT, CONTROL METHOD THEREFOR, AND STORAGE MEDIUM

BACKGROUND OF THE INVENTION

Field of the Invention

The present invention relates to an image forming apparatus with an attachable/detachable duplex unit, a control method therefor, and a storage medium.

Description of the Related Art

Conventionally, there has been known an image forming apparatus with an attachable/detachable duplex unit having an inversion conveying path and others for performing double-sided printing. This image forming apparatus is configured to be capable of detecting that the duplex unit is attached using a sensor, and upon receiving image data for double-sided printing in a state where attachment of the duplex unit has not been detected, display error information and stop a printing process.

There is also known an image forming apparatus which is configured to, when a duplex unit is attached in a state where attachment of the duplex unit has not been detected, carry out a printing process on print data which has been suspended until then (Japanese Laid-Open Patent Publication (Kokai) No. 2006-35564). According to Japanese Laid-Open Patent Publication (Kokai) No. 2006-35564, in a case where one-sided printing is performed, printing is possible even when the duplex unit is not attached, and hence a printing process for a one-sided print job is carried out without being suspended.

However, in an image forming apparatus with an attachable/detachable duplex unit when the duplex unit is not completely attached, there may be cases where the duplex unit is mechanically placed at an attachment position although attachment of the duplex unit has not been electrically detected. In such cases, according to a result of detection using a sensor, the duplex unit is not attached, and hence double-sided printing is not performed. However, when a one-sided print job is to be executed, arrangements for transmission of drive systems and configurations of conveying paths are intended for double-sided printing although in terms of control, control suitable for one-sided printing is provided, and as a result, one-sided printing may not be properly performed, causing a sheet jam. This may cause damage to the image forming apparatus.

Specifically, "a state where the duplex unit is completely detached" and "a state where the duplex unit is not completely attached although a user feels that he or she has attached the duplex unit" cannot be distinguished from each other by means of electric detection. Therefore, it is preferable to provide printing control with consideration given to both of these two states.

SUMMARY OF THE INVENTION

The present invention provides an image forming apparatus and a control method therefor, which are capable of preventing printing from being performed with a duplex unit incompletely attached, as well as a storage medium.

Accordingly, the present invention provides an image forming apparatus which is capable of performing one-sided printing and becomes capable of performing double-sided printing by attaching a duplex unit, comprising a printing unit configured to print an image on a sheet, a detection unit configured to detect attachment of the duplex unit, and a control unit configured to inhibit execution of one-sided printing and double-sided printing by said printing unit based on that said detection unit does not detect attachment of the duplex unit in a state where information to an effect that attachment of the duplex unit has been detected previously by said detection unit is stored.

According to the present invention, printing is prevented from being performed with the duplex unit incompletely attached.

Further features of the present invention will become apparent from the following description of exemplary embodiments (with reference to the attached drawings).

BRIEF DESCRIPTION OF THE DRAWINGS

FIG. 8 is a view showing an exemplary error indication.

DESCRIPTION OF THE EMBODIMENTS

The present invention will now be described with reference to the drawings showing embodiments thereof.

Figure 1:
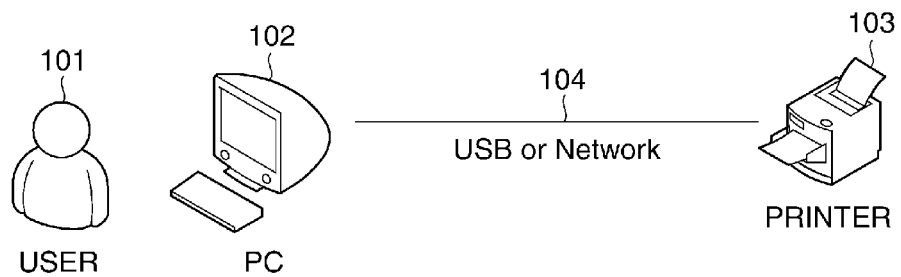
FIG. 1 is a view showing an arrangement of an image forming system having an image forming apparatus.

FIG. 1 is a view showing an arrangement of an image forming system having an image forming apparatus according to a first embodiment of the present invention. This image forming system is constructed such that a printer 103, which is the image forming apparatus, and a personal computer (PC) 102 are connected together via a network 104. Examples of the network 104 include a USB and a LAN, but this is not limitative. By issuing instructions from applications running on the PC 102, a user 101 is allowed to configure arbitrary settings on the printer 103 and instruct the printer 103 to perform printing.

Figure 2:
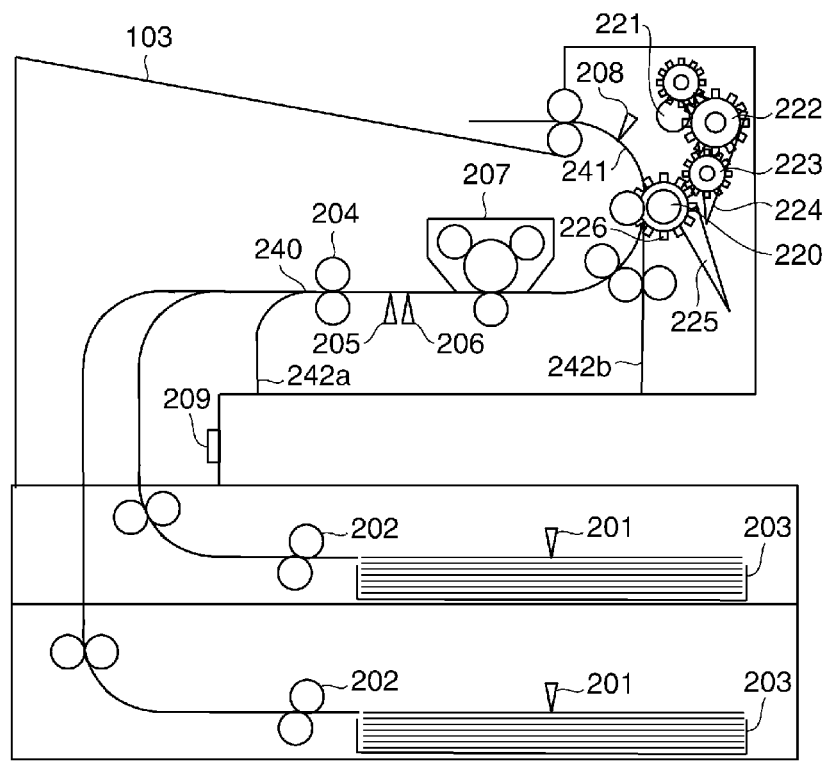
FIG. 2 is a cross-sectional view schematically showing an arrangement of a printer with a duplex unit not attached.
Figure 3:
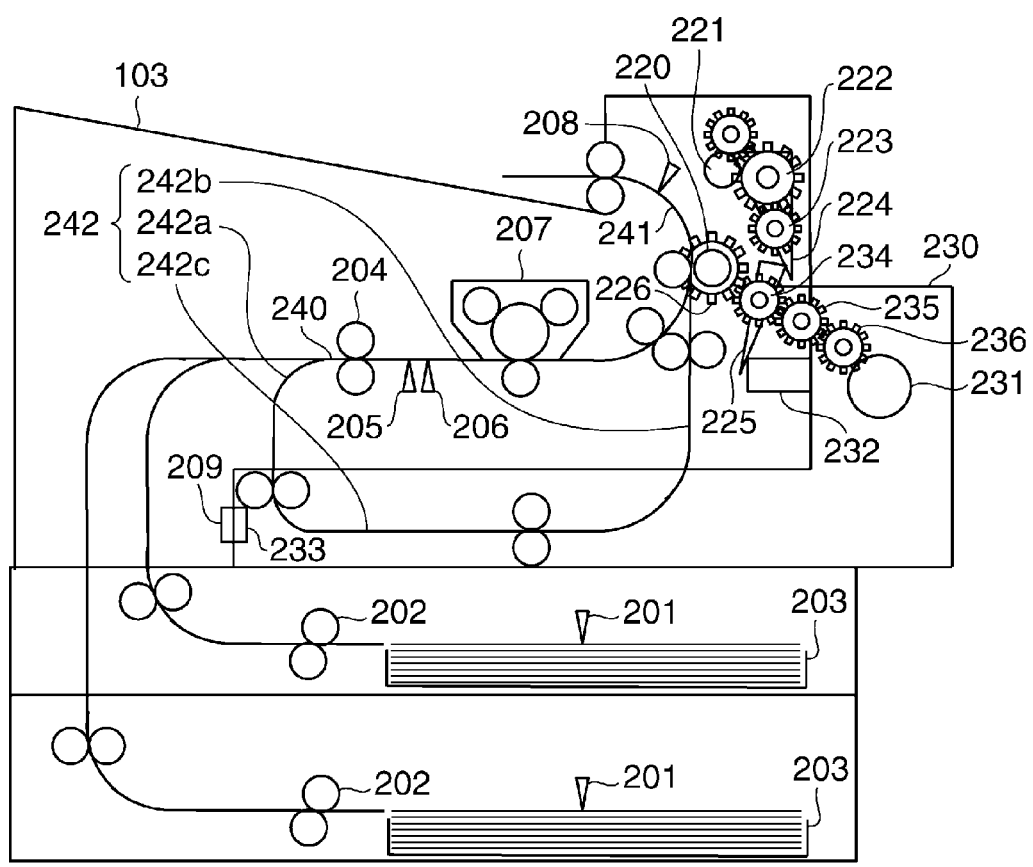
FIG. 3 is a cross-sectional view schematically showing an arrangement of the printer with the duplex unit attached.

FIGS. 2 and 3 are cross-sectional views schematically showing an arrangement of the printer 103. The printer 103 is configured such that a duplex unit 230 for printing both sides of a recording material is attachable to and detachable from the printer 103. FIGS. 2 and 3 show an unattached state (detached state) and an attached state, respectively, of the duplex unit 230. The duplex unit 230 is an optional unit which is attachable to and detachable from the printer 103. Main component elements of the printer 103 will now be described with reference to FIG. 3.

The printer 103 has two recording material cassettes 203, an image forming unit 207, and the duplex unit 230, and also has a main conveying path 240, a discharging conveying path 241, and an inverting conveying path 242 which are main conveying paths. Among these conveying paths, the inverting conveying path 242 is comprised of inverting conveying paths 242a and 242b, which are formed in a main body of the printer 103, and an inverting conveying path 242c, which is formed inside the duplex unit 230. When the duplex unit 230 is properly attached to the printer 103, the inverting conveying paths 242a, 242c, and 242b are continuous.

The printer 103 also has a plurality of rollers, for example, two feeding roller pairs 202, a registration roller pair 204, and a sheet discharging roller 220 so as to convey recording materials on the conveying paths. Further, the printer 103 has a plurality of sensors for detecting a recording material in the apparatus, for example, two recording material presence-absence sensors 201, a registration sensor 205, a recording material detecting sensor 206, a discharge sensor 208, and a duplex unit detecting sensor 209. The recording material cassettes 203 supply recording materials, on which images are to be formed, into the apparatus.

The image forming unit 207 has an exposure unit, a photosensitive drum, and a developing unit so as to form an image on a recording material. The image forming unit 207 causes the exposure unit to form an electrostatic latent image on the photosensitive drum which is an image carrier. This electrostatic latent image is formed based on image data received by a controller unit 513 (FIG. 6), to be described later. The formed electrostatic latent image is developed by the developing unit and transferred onto a recording material at a predetermined transfer position. The toner image transferred onto the recording material is fixed on the recording material by heating and pressurizing using a fixing device (not shown).

The main conveying path 240, which extends from the feeding rollers 202 to the sheet discharging roller 220, is a conveying path for forming an image on a recording material. The discharging conveying path 241, which extends from the sheet discharging roller 220 to an outside of the printer 103, is a conveying path for discharging a recording material from the apparatus (downstream). When both sides of a recording material are to be printed, the discharging conveying path 241 conveys the recording material on a first side, i.e. a front side of which an image is formed to the inverting conveying path 242. The inverting conveying path 242, which extends from the sheet discharging roller 220 to the registration rollers 204 through the interior of the duplex unit 230, is a conveying path for supplying an inverted recording material to the main conveying path 240.

The recording material presence-absence sensors 201 detect the presence or absence of a recording material mounted on the recording material cassettes 203. The registration sensor 205, the recording material detecting sensor 206, and the discharge sensor 208 detect a recording material being conveyed. These sensors may be either switches with a mechanical configuration or sensors with an optical configuration. The registration sensor 205 is also used to adjust the timing of transfer of a toner image, which is formed on the photosensitive drum, onto a recording material being conveyed. The registration sensor 205 is also used to measure the length of a recording material in a sub scanning direction. The length of a recording material in the sub scanning direction is obtained based on a time period for which the registration sensor 205 detects a recording material being conveyed and a speed at which the recording material is conveyed. The recording material detecting sensor 206 is used to detect the presence or absence of a recording material at both ends of the main conveying path 240 and obtain the length of the recording material in a main scanning direction.

The duplex unit detecting sensor 209 is a sensor for detecting whether or not the duplex unit 230 is attached. The duplex unit detecting sensor 209 may be a switch with a mechanical configuration, but in the present embodiment, a sensor with an electric configuration which detects attachment of the duplex unit 230 by coming into contact with a connector 233 provided on the duplex unit 230 side and passing electric current through the connector 233 is adopted. The duplex unit detecting sensor 209 and a CPU 501 correspond to a detection unit according to the present invention.

The feeding rollers 202 convey recording materials, which are mounted on the corresponding recording material cassettes 203, one by one into the apparatus. The registration rollers 204 adjust the timing with which the image forming unit 207 transfers an image onto a recording material being conveyed. The sheet discharging roller 220 discharges a recording material from the apparatus. A drive gear 226 is capable of rotating forward and backward, and the sheet discharging roller 220 rotates integrally with the drive gear 226.

A fixing motor 221 and a duplex motor 231 selectively act as a drive source for the drive gear 226 although their drive relationship will be described in detail with reference to FIGS. 4A and 4B. When the fixing motor 221 is a drive source for the drive gear 226, the drive gear 226 rotates forward by receiving power from the fixing motor 221 via fixing gears 222 and 223 and causes the sheet discharging roller 220 to rotate forward (FIG. 2). When the duplex motor 231 is a drive source for the drive gear 226, the drive gear 226 rotates backward by receiving power from the duplex motor 231 via duplex unit gears 236, 235, and 234 and causes the sheet discharging roller 220 to rotate backward (FIG. 3).

In the present embodiment, when the duplex unit 230 is not attached and when the duplex unit 230 is attached, the sheet discharging roller 220 is rotated using power of the fixing motor 221 and the duplex motor 231, respectively. When both sides of a recording material are to be printed, the sheet discharging roller 220 conveys the recording material with an image formed on a first side thereof to the discharging conveying path 241 and then rotates backward to convey the recording material to the inverting conveying path 242.

The main body of the printer 103 is equipped with a drive cancellation lever 225 which is displaceable. The duplex unit 230 is equipped with a drive cancellation lever depression unit 232. The duplex unit 230, which includes a part of the inverting conveying path 242, conveys a recording material when a second side, i.e. a reverse side of the recording material is to be printed. Here, when the duplex unit 230 is attached, the drive cancellation lever depression unit 232 of the duplex unit 230 urges the drive cancellation lever 225, causing the drive source which rotatively drives the sheet discharging roller 220 to switch from the fixing motor 221 to the duplex motor 231. This mechanism and conveyance of a recording material depending on the presence or absence of the duplex unit 230 will be described in detail with reference to FIGS. 4A and 4B.

Figure 4A:
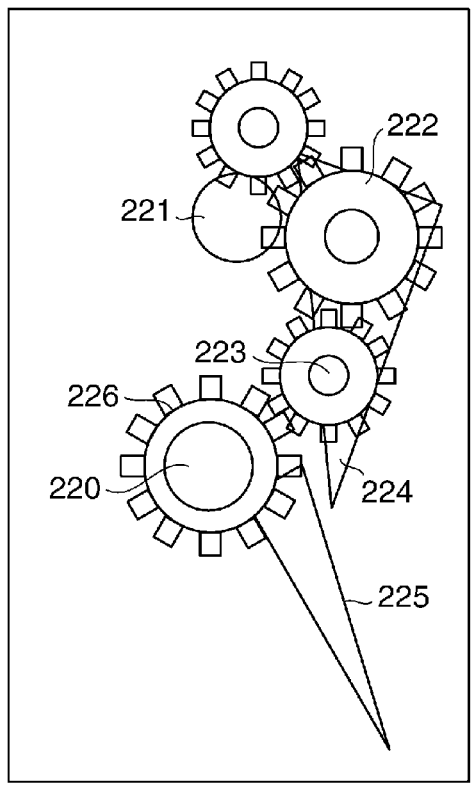
FIG. 4A is an enlarged view showing a sheet discharging roller and a fixing motor and their vicinity when the duplex unit is not attached.
Figure 4B:
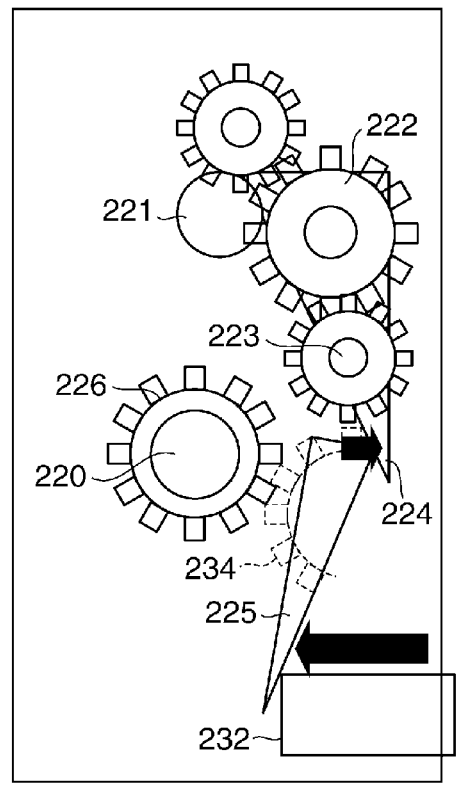
FIG. 4B is an enlarged view showing the sheet discharging roller and the fixing motor and their vicinity when the duplex unit is attached.

FIGS. 4A and 4B are enlarged views of the sheet discharging roller 220 and the fixing motor 221 and their vicinity when the duplex unit 230 is unattached and when the duplex unit 230 is attached, respectively.

The fixing motor 221, which is a motor attached to the fixing device (not shown), is a power source which transmits power to the fixing gear 222 and others. The drive cancellation lever 225 is rotatable clockwise and counterclockwise as viewed in FIG. 4A and urged counterclockwise by a spring or the like. When the drive cancellation lever 225 is free, it comes into abutment with a stopper, not shown, and is positioned as shown in FIG. 4A.

The fixing gear 222 and the fixing gear 223 are disposed so as to be rotatable with respect to a gear house 224. The gear house 224 is rotatable using a central shaft of the fixing gear 222 as a rotation center. When the gear house 224 rotates, a rotation center of the fixing gear 223 moves accordingly, but since the center of the fixing gear 222 and the rotation center of the gear house 224 are the same, the fixing gear 222 does not move. The gear house 224 is rotatable clockwise and counterclockwise as viewed in FIG. 4A and urged clockwise by a spring or the like.

Figure 5A:
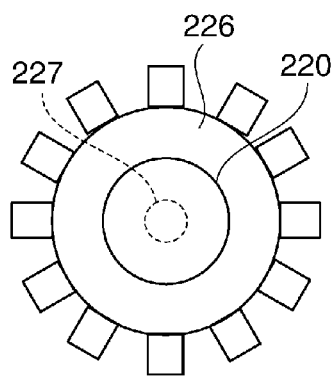
FIG. 5A is a view showing a drive gear and the sheet discharging roller as viewed from a direction of an axis of their rotation center.
Figure 5B:
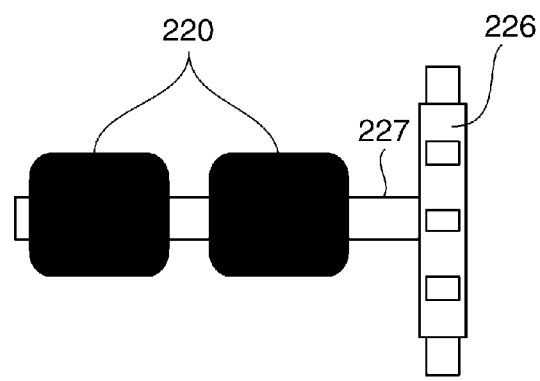
FIG. 5B is a view showing the drive gear and the sheet discharging roller as viewed from a direction vertical to the axis.

FIG. 5A is a view showing the drive gear 226 and the sheet discharging roller 220 as viewed from a direction of an axis of their rotation center. This view is taken from the same direction as FIG. 4A. FIG. 5B is a view showing the drive gear 226 and the sheet discharging roller 220 as viewed from a direction vertical to the axis of their rotation center.

A rotary shaft 227 is mounted on a center of the drive gear 226, and in an axial direction of the rotary shaft 227, a plurality of (two) sheet discharging rollers 220 is mounted on the rotary shaft 227. The drive gear 226 rotating forward causes the sheet discharging rollers 220 as well to rotate forward through the rotary shaft 227, and the drive gear 226 rotating backward causes the sheet discharging rollers 220 as well to rotate backward.

To print both sides of a recording material with the duplex unit 230 attached, it is necessary to convey the recording material to the inverting conveying path 242 by rotating the sheet discharging roller 220 backward after conveying the recording material with an image formed on a front side thereof to the discharging conveying path 241 as described earlier. However, trying to cause this backward rotation using power of the fixing motor 221 would cause the fixing device (not shown) as well to rotate backward. It is usually preferred that the fixing device rotates only forward, and hence in order to prevent the fixing device from rotating backward even if the fixing motor 221 rotates backward, members such as gears and clutches have to be added, causing an increase in the number of components and costs.

Accordingly, in the present embodiment, the drive gear 226 and the sheet discharging roller 220 for performing double-sided printing are caused to rotate backward using the duplex motor 231 (FIG. 3), which is provided inside the duplex unit 230, not the fixing motor 221. Here, assuming that both power of the fixing motor 221 and power of the duplex motor 231 are transmitted to the drive gear 226, the drive gear 226 may be strained and broken. For this reason, mechanically exclusive control is provided so that power of only of them can always be transmitted. A description will now be given of this exclusive control.

When the duplex unit 230 is attached, the drive cancellation lever depression unit 232 provided in the duplex unit 230 urges a lower part of the drive cancellation lever depression unit 225 in the printer 103 as shown in FIG. 4B. This cause an upper part of the drive cancellation lever depression unit 225 to move in a direction opposite to the direction in which it is urged by the drive cancellation lever depression unit 232 and push the gear house 224. When the gear house 224 is pushed by the drive cancellation lever depression unit 225, the fixing gear 223 fixed to the gear house 224 also moves in the same direction, and in the end, the fixing gear 223 and the drive gear 226 are disconnected from each other.

On the other hand, when the duplex unit 230 is attached, the drive gear 226 and the duplex unit gear 234 are connected together. The duplex unit gear 234 is indirectly coupled to the duplex motor 231 via the duplex unit gears 235 and 236 and rotated by power of the duplex motor 230. As a result, when the duplex unit 230 is attached, the drive gear 226 is rotated by power of the duplex motor 231, not the fixing motor 221. Conversely, when the duplex unit 230 is detached, the fixing gear 223 and the drive gear 226 are connected back together since there is no pressure from the drive cancellation lever depression unit 232 (FIG. 4A).

Here, assuming that the duplex unit 230 is not completely attached, the duplex unit detecting sensor 209 and the connector 233 on the duplex unit 230 do not come into contact with each other. Thus, a printer unit 511, to be described later, which is a printing unit, cannot detect that the duplex unit 230 has been attached. In this state, however, when the duplex unit 230 is positioned substantially at an attachment position, the drive cancellation lever depression unit 232 urges the drive cancellation lever 225, and the source of power to the drive gear 226 may switch from the fixing motor 221 to the duplex motor 231. Thus, a state in which the duplex unit 230 is mechanically attached but it is not electrically detected that the duplex unit 230 is attached is referred to as a "half inserted" state of the duplex unit 230.

When the duplex unit 230 is in the half inserted state, the printer unit 511 does not detect that the duplex unit 230 is attached, and hence at the time of printing, control is provided such that the fixing motor 221 is run to rotate the drive gear 226 and the sheet discharging roller 220 forward. Mechanically, however, the fixing gear 223 and the drive gear 226 are separated from each other, and hence power of the fixing gear 223 is not transmitted to the drive gear 226, and the sheet discharging roller 220 does not rotate. As a result, a recording material cannot be conveyed at the location of the sheet discharging roller 220 to cause a sheet jam. Repeated occurrence of such sheet jams is inconvenient for the user 101, and additionally, may cause damage to the printer 103. The present embodiment aims to reduce the frequency of such sheet jams.

Figure 6:
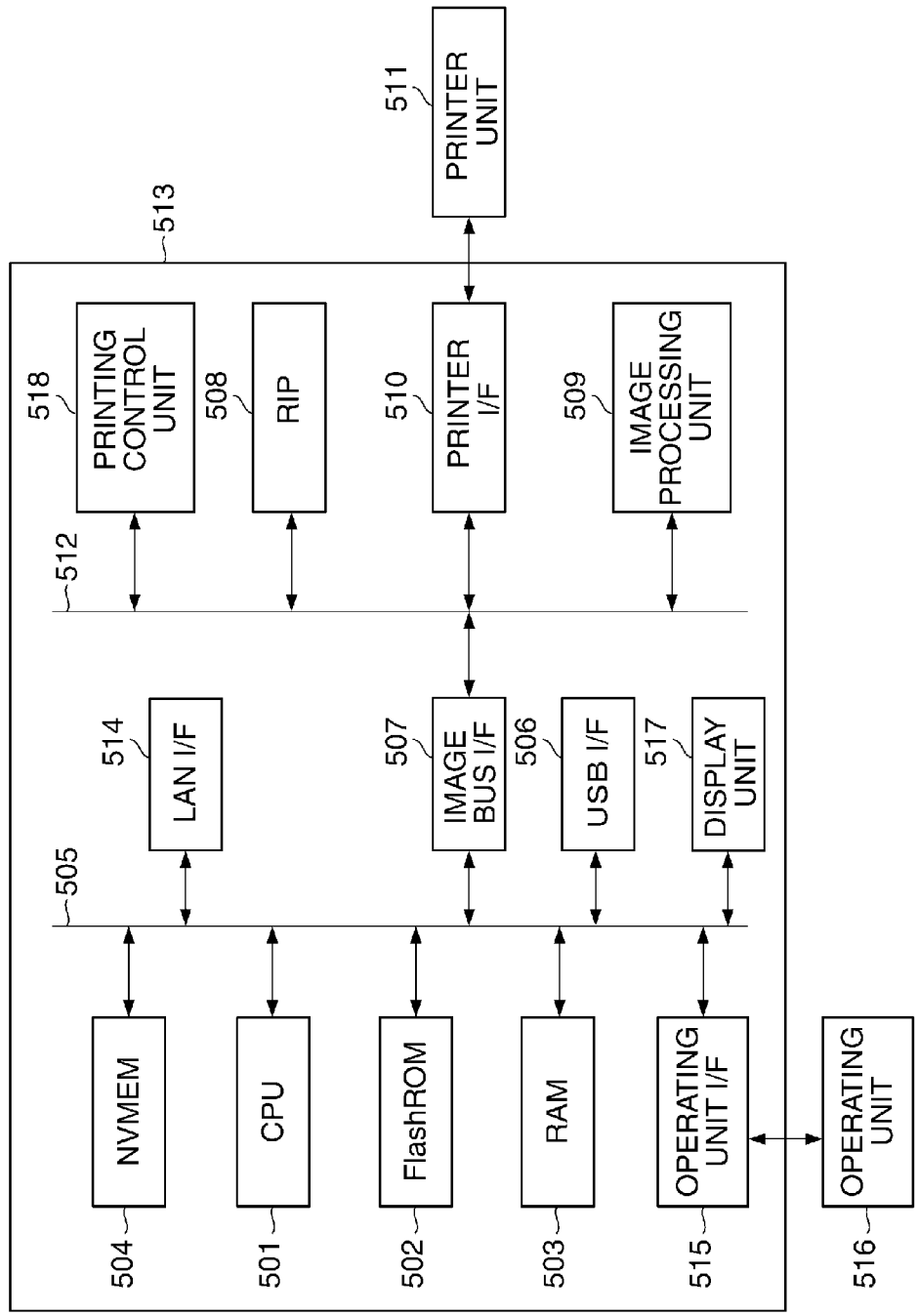
FIG. 6 is a block diagram showing a hardware arrangement of a controller unit.

FIG. 6 is a block diagram showing a hardware arrangement of the controller unit 513 in the printer 103. The controller unit 513 inputs and outputs image data and device information by connecting to the printer unit 511 which acts as an image output device. The CPU 501 is a processer which controls the entire printer 103 and corresponds to a control unit of the present invention. A RAM 503 is a system work memory for the CPU 501 to operate and is also a program memory for recording programs and an image memory for temporarily recording image data. An NVMEM 504 is a nonvolatile memory and records, for example, setting information. The NVMEM 504, however, may be another storage device such as an HDD.

An operating unit 516 has keys for operating devices and an LED showing statuses of the devices. An operating unit I/F 515, which is an interface to the operating unit 516, plays a role in transmitting control information for the LED to the operating unit 516 and transmitting information input by the user 101 through the operating unit 516 to the CPU 501. A display unit 517 displays a message which notifies the user 101 of a status of the printer unit 511 and displays information input by the user 101.

A flash ROM 502 is a rewritable nonvolatile memory, in which various control programs for controlling the printer 103 are recorded. A USB interface 506 allows USB connection with an external apparatus. A LAN interface 514 allowed LAN connection with an external apparatus. These devices are placed on a system bus 505.

An image bus I/F 507 is a bus bridge which converts a data structure and connects an image bus 512, which transfers image data at high speed, and the system bus 505 together. The image bus 512 is comprised of a PCI bus or IEEE 1394. Devices described hereafter are placed on the image bus 512. A raster image processor (RIP) 508 expands vector data such as a PDL code into a bitmap image. A printer I/F 510 connects the printer unit 511 and the controller unit 513 together, performs synchronous-to-asynchronous conversion of image data, sends and receives control commands, and supplies power.

An image processing unit 509 corrects, processes, and edits input image data and performs printer stabilization, resolution conversion, and so on for printout image data. The image processing unit 509 also carries out rotation of image data, JPEG compression-decompression of multivalued image data and JBIG compression-decompression, MMR compression-decompression, MH compression-decompression, and so on of binary-coded image data.

A printing control unit 518 compares a status of the printer unit 511 and setting information held in the NVMEM 504 with input image data and print settings thereon, and when execution of printing is not appropriate, the printing control unit 518 stops execution of printing and notifies the CPU 501 to indicate an error on the display unit 517. For example, when the duplex unit 230 is not attached although print settings on input image data indicate an instruction to perform double-sided printing, the printing control unit 518 notifies the CPU 501 that it is necessary to attach the duplex unit 230. The printing control unit 518 also receives information indicative of, for example, which page has been completely printed from the printer unit 511 and manages the progress of printing.

The printer unit 511 converts raster image data to an image on a sheet. Examples of a process therefor include an electrophotographic process using a photosensitive drum or a photosensitive belt, and an inkjet process in which an image is directly printed on a sheet using ink discharged from a micro nozzle array, but any process may be used. A printing operation is started in response to an instruction from the CPU 501. A detection signal from the duplex unit detecting sensor 209 is supplied to the printer unit 511 and then transmitted from the printer unit 511 to the CPU 501 of the controller unit 513.

Figure 7:
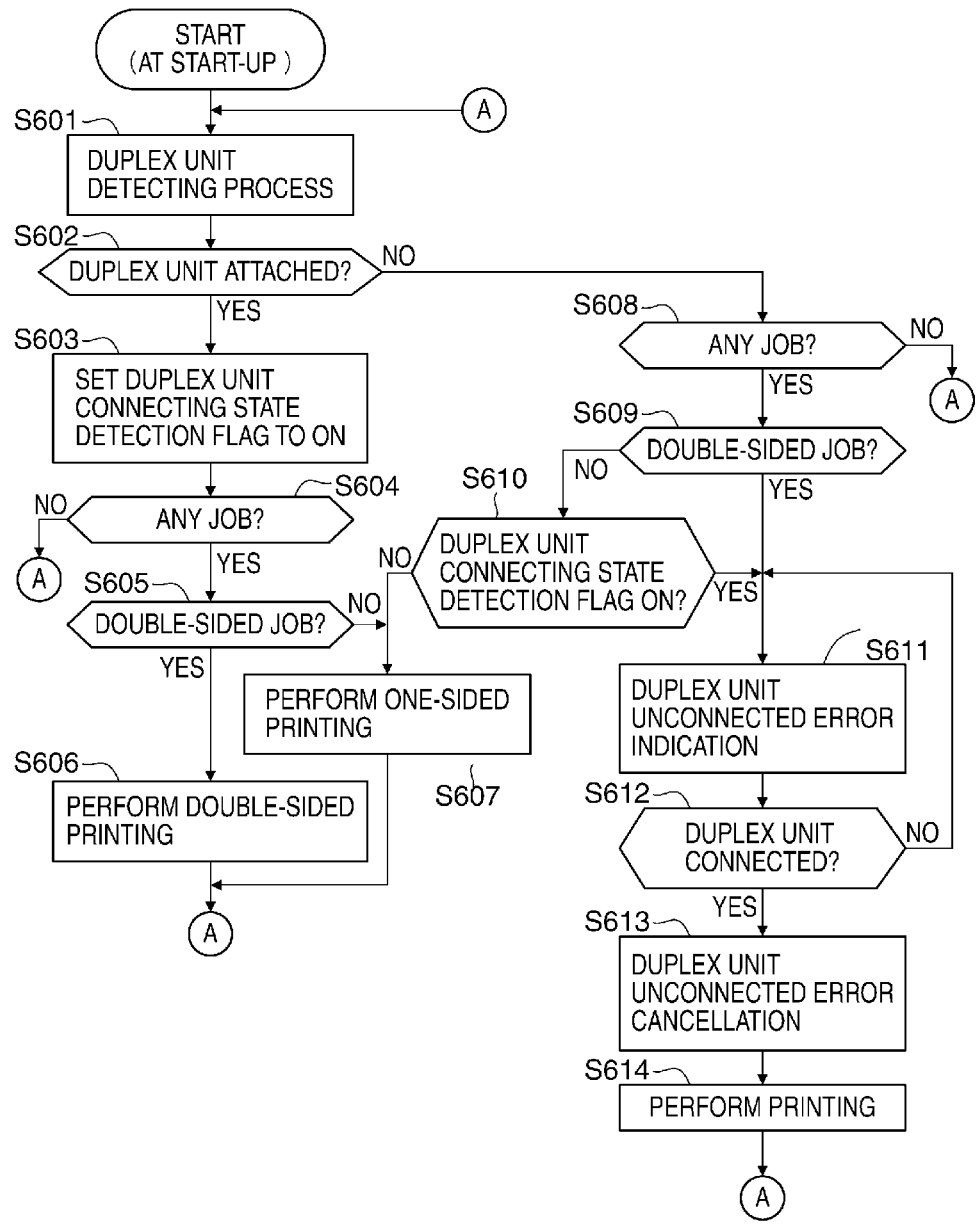
FIG. 7 is a flowchart of a process at start-up.

FIG. 7 is a flowchart of a process at start-up. This process is carried out by the CPU 501 of the controller unit 513 executing a program stored in the flash ROM 502. Here, the time of start-up corresponds to the time when the power to the apparatus is turned on or the time of return from a power-saving mode.

First, in step S601, in an initialization process at start-up, the CPU 501 detects the presence or absence of the duplex unit 230 based on information about attachment of the duplex unit 230 which the controller unit 513 has received from the printer unit 511. The reason why the presence or absence of the duplex unit 230 is detected in the initialization process is that in many cases, the user 101 attaches or detaches the duplex unit 101 while the power to the printer 103 is off or in the power-saving mode.

It should be noted that the process to detect the duplex unit 230 may be implemented by the CPU 501 inquiring of the printer unit 511 at regular time intervals or by the printer unit 511 providing the CPU 501 with a changing notification about a change in the presence or absence of the duplex unit 230 whenever the presence or absence of the duplex unit 230 changes. In the present embodiment, the CPU 501 inquiring of the printer unit 511 at regular time intervals is adopted.

Next, based on the result of the detecting process in the step S601, the CPU 501 determines whether or not there is the duplex unit 230 (attached or not attached) (step S602). As a result of the determination in the step S602, when there is the duplex unit 230, a duplex unit connecting state detection flag F1 is set to on (step S603). The detection flag F1 is stored in the RAM 503, which is a storage unit, and when it is determined that there is the duplex unit 230 (attached) at least once after the start of the apparatus, the detection flag F1 is set to on. After that, the RAM 503 keeps the detection flag F1 on until the power is turned off. Thus, once the detection flag F1 is set to on, the detection flag F1 is kept on until the power to the apparatus is turned off no matter how many times the duplex unit 230 is attached or detached.

Then, the CPU 501 determines whether or not any job has been submitted (step S604). When the CPU 501 determines in the step S604 that no job has been submitted, the process returns to the step S601. It should be noted that when a changing notification about a change in the presence or absence of the duplex unit 230 is sent from the printer unit 511 to the CPU 501, control should be provided such that submission of a job is waited for while the changing notification is waited for in the step S601. In this case, when a job is submitted, the process proceeds to step S605, and when a notification about a change in the presence or absence of the duplex unit 230 is received from the printer unit 511, the process proceeds to the step S602.

On the other hand, as a result of the determination in the step S604, when any job has been submitted, the CPU 501 determines whether or not the job is a double-sided job (step S605). Here, a double-sided job is a job in which both sides of a recording material are printed, and a one-sided job is a job in which only a front side of a recording material is printed. As a result of the determination in the step S605, when the submitted job is a double-sided job, the CPU 501 instructs the printing control unit 518 to perform double-sided printing, and the printing control unit 518 performs double-sided printing (step S606). On the other hand, when the submitted job is a one-sided job, the CPU 501 instructs the printing control unit 518 to perform one-sided printing, and the printing control unit 518 performs one-sided printing (step S607). After the processes in the steps S606 and S607, the process returns to the step S601.

As a result of the determination in the step S602, when there is not the duplex unit 230, the CPU 501 determines whether or not any job has been submitted (step S608). When the CPU 501 determines in the step S608 that no job has been submitted, the process returns to the step S601. The flow of the process in this case is the same as that in the case where it is determined in the step S604 that no job has been submitted. On the other hand, when any job has been submitted, the CPU 501 determines whether or not the job is a double-sided job (step S609).

As a result of the determination in the step S609, when the submitted job is not a double-sided job but a one-sided job, the CPU 501 determines whether or not the detection flag F1 held in the RAM 103 is on (step S610). As a result of the determination in the step S610, when the detection flag F1 is not on, the CPU 501 instructs the printing control unit 518 to perform one-sided printing, and the printing control unit 518 performs one-sided printing (step S607).

When the detection flag F1 is not on, this means that the duplex unit 230 has never been attached since start-up. In this case, there is a high possibility that the user 101 does not own the duplex unit 230 to begin with, or there is a high possibility that the user 101 does not use the duplex unit 230 on a routine basis, and hence the duplex unit 230 is not likely to be half inserted. Thus, the CPU 501 provides control to allow execution of one-sided printing as usual.

On the other hand, as a result of the determination in the step S610, when the detection flag F1 is on, the CPU 501 notifies the display unit 517 to display an error indication (duplex unit missing error) indicating that the duplex unit 230 is not attached (step S611).

FIG. 8 is a view showing an exemplary error indication displayed on the display unit 517. This error indication preferably includes information to the effect that the duplex unit 230 is not attached and a request to check if the duplex unit 230 is attached and to attach the duplex unit 230. Here, the reason why an error indication is displayed when it is determined in the step S610 that the detection flag F1 is not on is to prevent execution of printing with the duplex unit 230 half inserted. Namely, this determination result means that the duplex unit 230 has been attached at least one since startup, but the duplex unit 230 is not attached at present. Examples of such situations include a case where the duplex unit 230 is detached once due to occurrence of a sheet jam or the like during printing using the duplex unit 230, and after that, one-sided printing is going to be performed.

However, whether the duplex unit 230 is detached so as to perform one-sided printing or the duplex unit 230 is not properly attached (that is, half inserted) although the duplex unit 230 was thought to be attached cannot be determined based on only a result of detection using the duplex unit detecting sensor 209. Thus, the CPU 501 does not immediately perform one-sided printing but displays an error indication on the display unit 517 to notify the user 101 to properly attach the duplex unit 230 again when the duplex unit 230 is half inserted. This decreases the possibility that a sheet jam occurs due to printing being performed with the duplex unit 230 half inserted.

As a result of the determination in the step S609, when the submitted job is a double-sided job, attachment of the duplex unit 230 is absolutely necessary. Thus, the CPU 501 causes the display unit 517 to display an error indication (FIG. 8) irrespective of whether the detection flag F1 is on, requesting the user 101 to attach the duplex unit 230 (step S611).

Then, in step S612, the CPU 501 determines whether or not the duplex unit 230 has been attached anew. When the CPU 501 determines in the step S612 that the duplex unit 230 has not been attached, the process returns to the step S611. Thus, while the error indication is being displayed on the display unit 517, the CPU 501 continues observing whether or not the duplex unit 230 has been attached anew. The CPU 501 provides control to continuously display the error indication so that printing cannot be performed (printing can be inhibited) until the duplex unit 230 is attached.

When the duplex unit 230 is attached while the processes in the steps S611 and S612 are repeatedly carried out, the CPU 501 notifies the display unit 517 to cancel the error indication (step S613). Further, the CPU 501 instructs the printing control unit 518 to perform double-sided printing or one-sided printing for the submitted job according to print settings on image data (step S614). As a result, the inhibition of printing is canceled. After that, the process returns to the step S601.

According to the present embodiment, when a one-sided job is to be executed, and it is determined that the duplex unit 230 is not attached in a state where information to the effect that the duplex unit 230 is attached is stored, the CPU 501 provides control to inhibit printing. This prevents double-sided printing or one-sided printing from being performed with the duplex unit 230 not properly attached and prevents occurrence of a sheet jam caused by half insertion of the duplex unit 230.

Moreover, even after printing is inhibited, the inhibition of printing is canceled when it is detected anew that the duplex unit 230 has been attached anew, a printing process is quickly resumed. Further, when printing is inhibited, an error indication (FIG. 8) is displayed to request attachment of the duplex unit 230, and this informs the user of a process to resume printing.

Further, whether or not the duplex unit 230 is attached is detected at least on start-up, and it is thus possible to properly cope with a situation where the duplex unit 230 is attached or detached before start-up.

In the present embodiment, examples of the cases where it is determined in the step S610 in FIG. 7 that the detection flag F1 is on include a case where printing has been performed with the duplex unit 230 attached, but due to occurrence of a failure, the duplex unit 230 is detached, and one-sided printing is going to be performed. However, according to the way of control in the first embodiment, when one-sided printing is desired to be performed after an error indication is displayed, there is no other choice but to attach the duplex unit 230 or to temporarily turn off the power with the duplex unit 230 not attached and then turn on the power. When the duplex unit 230 fails, the latter is usually adopted. This requires time and effort to turn off and on the power or re-submit image data that has disappeared due to turning-off of the power, and troublesome for the user 101.

Accordingly, in a second embodiment of the present invention, a means for canceling an error indication and a printing-inhibited state (this is referred to as "error cancellation") even without attaching the duplex unit 230 in the above described case is added. However, if error cancellation is allowed where the duplex unit 230 is half inserted, the possibility of damage to the printer 103 would increase. Therefore, a mechanism for inhibiting error cancellation while the duplex unit 230 is half inserted is also introduced.

Figure 9:
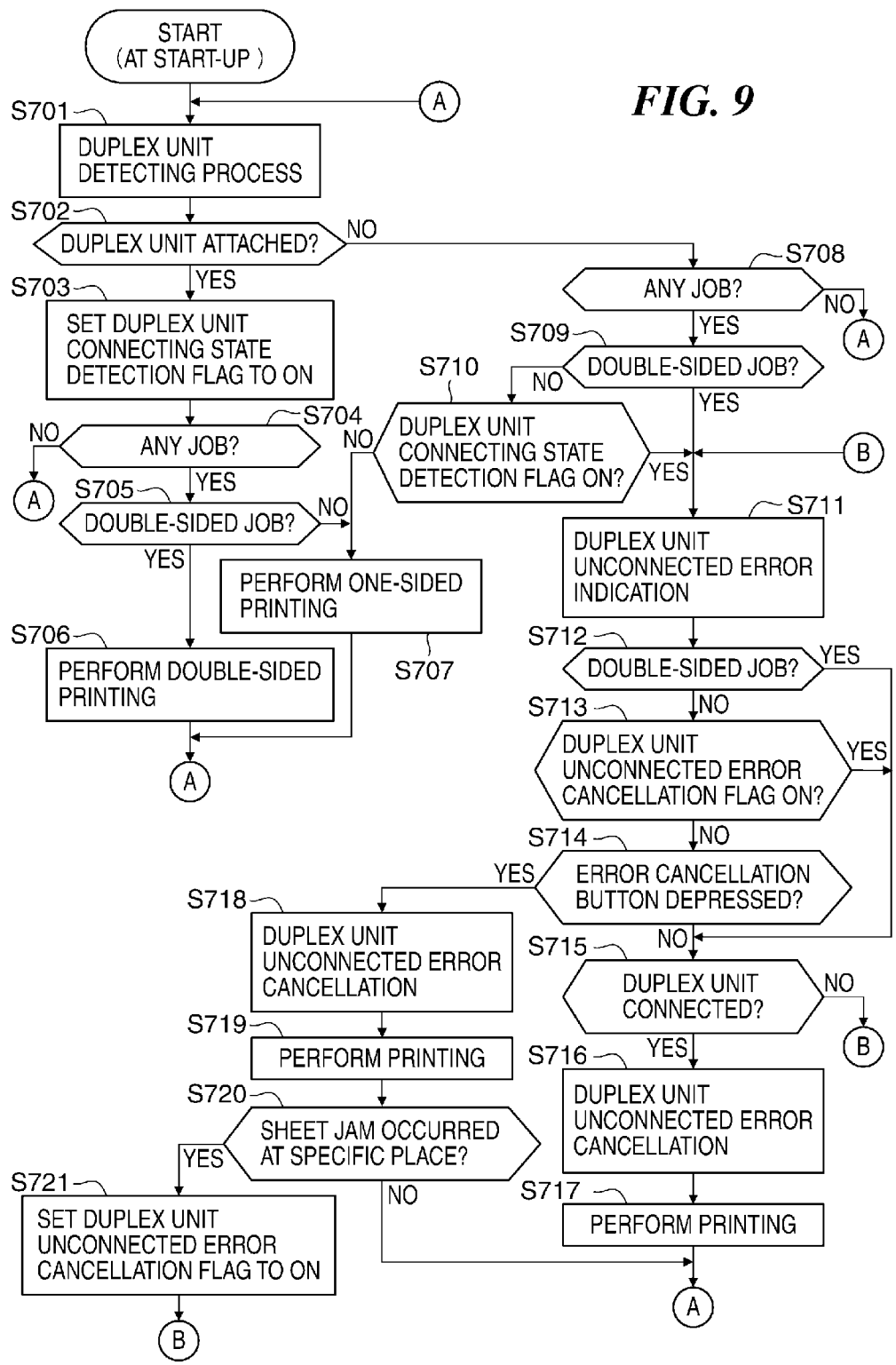
FIG. 9 is a flowchart of a process at startup.

The second embodiment differs from the first embodiment in terms of a process at startup, and FIG. 9 is used in place of FIG. 7 in the following description of the second embodiment. In the present embodiment, it is assumed that the operating unit 516 has an error cancellation button (not shown) for receiving an error cancellation instruction from a user. The other constructions are the same as those in the first embodiment.

FIG. 9 is a flowchart of a process at startup. Processes in steps S701 to S711 are the same as those in the steps S601 to S611 in FIG. 7. After the process in the step S711, the CPU 501 determines whether or not a submitted job is a double-sided job (step S712). As a result of the determination in the step S712, when the submitted job is a double-sided job, attachment of the duplex unit 230 is absolutely necessary, and hence the process proceeds to step S715 without processes in steps S713 and S714 being carried out. Thus, when the submitted job is a double-sided job, the duplex unit 230 is absolutely necessary, and error cancellation is disabled.

On the other hand, when the submitted job is not a double-sided job but a one-sided job, the CPU 501 determines whether or not a duplex unit unconnected error cancellation flag F2 is on (step S713). Here, the cancellation flag F2 is a flag which is set to on in step S721, to be described later, and stored in the RAM 503. The cancellation flag F2 is set to on when a sheet jam occurs near the sheet discharging roller 220 during printing for a one-sided job after error cancellation.

As a result of the determination in the step S713, when the cancellation flag F2 is not on, the CPU 501 determines whether or not the error cancellation button of the operating unit 516 has been depressed (step S714). Namely, the error cancellation button of the operating unit 516 is enabled, and the user is allowed to perform error cancellation. As a result of the determination in the step S714, when the error cancellation button of the operating unit 516 has not been depressed, the process proceeds to the step S715.

On the other hand, as a result of the determination in the step S714, when the error cancellation button of the operating unit 516 has been depressed, the CPU 501 notifies the display unit 517 to perform error cancellation (step S718). Further, the CPU 501 instructs the printing control unit 518 to perform one-sided printing for a one-sided job (step S719). As a result, the inhibition of printing is canceled. Namely, even without attaching the duplex unit 230, error cancellation is performed to immediately perform printing, and one-sided printing is properly executed insofar as there is no problem such as half insertion of the duplex unit 230.

Then, the CPU 501 determines whether or not a sheet jam has occurred at a specific place (step S720). Here, the specific place is, for example, near the sheet discharging roller 220 on the conveying path. This is because the rotating action of the sheet discharging roller 220 depends on attachment and detachment of the duplex unit 230. The specific place, however, should not always be at this position. For example, a sheet jam occurring at any place on the main conveying path 240 or the discharging conveying path 241 may be detected. It should be noted that occurrence of a sheet jam may be detected using any method, and for example, a sensor, not shown, may be used or a load of a motor may be detected to detect occurrence of a sheet jam.

When a sheet jam occurs near the sheet discharging roller 220, the duplex unit 230 is likely to be half inserted. Thus, as a result of the determination in the step S714, when a sheet jam occurs at the specific place, the CPU 501 sets the cancellation flag F2 to on which is stored in the RAM 503 (step S721).

After the process in the step S721, the process returns to the step S711. Thus, an error indication is displayed again. It should be noted that when the process proceeds from the step S721 to the step S711, the error indication may include information to the effect that the sheet jam has occurred. Further, as a result of the determination in the step S713, when the cancellation flag F2 is on, the process proceeds to the step S715 without the process in the step S714 being carried out.

Therefore, when a sheet jam occurs near the sheet discharging roller 220 during printing for a one-sided job after error cancellation, the error cancellation button of the operating unit 516 is disabled, and the user 101 is not allowed to perform operation for error cancellation. This prevents occurrence of an additional sheet jam caused by, for example, half-insertion of the duplex unit 230.

In the step S715, the CPU 501 determines whether or not the duplex unit 230 has been attached anew. When the CPU 501 determines in the step S715 that the duplex unit 230 has not been attached, the process returns to the step S711. Thus, as long as the error cancellation button of the operating unit 516 is not effectively operated, and the duplex unit 230 is kept unattached, the CPU 501 continues display of the error indication so as to inhibit printing from being performed. On the other hand, when the CPU 501 determines that the duplex unit 230 has been attached, the process proceeds to step S716. In the steps S716 and S717, the CPU 501 carries out the same processes as those in the steps S613 and S614 in FIG. 7.

According to the present embodiment, as for preventing execution of printing with the duplex unit 230 not properly attached, the same effects as those in the first embodiment are obtained. In addition, inhibition of printing is canceled when an error cancellation instruction is received, and hence a printing process is resumed without complicated operations such as turning-on or off of power supply and re-submission of image data. Further, when a sheet jam occurs after inhibition of printing is canceled, control is provided such that an error cancellation instruction is not allowed to be received afterward. This prevents printing from being performed with the duplex unit 230 incompletely attached even after error cancellation.

It should be noted that an image forming apparatus to which the present invention is applied is not limited to the printer 103 as long as it is of a type with an attachable/detachable duplex unit, and the present invention may be applied to any types of image processing apparatuses using any printing methods. Moreover, all units for implementing the present invention should not necessarily be provided inside the printer 103 which is a stand-alone unit. A processing unit placed and constructed at any place on an image forming system may be responsible for part or all of processes which are configured to be carried out by the CPU 501.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-170570, filed Aug. 25, 2014, which is hereby incorporated by reference herein in its entirety.

What is claimed is:

1. An image forming apparatus configured to perform one-sided printing without attaching a duplex unit and double-sided printing using the duplex unit, comprising:
   a printing unit configured to print an image on a sheet;
   a detector configured to detect whether or not the duplex unit is attached, wherein information corresponding to a first detection that the duplex unit is attached is stored in a storage unit; and
   a controller configured to inhibit performing of one-sided printing by the printing unit based on the information stored in the storage unit and a current detection by the detector that the duplex unit is not attached.

2. The image forming apparatus according to claim 1, further comprising a display configured to display an error screen based on the information stored in the storage unit and the current detection by the detector that the duplex unit is not attached.

3. The image forming apparatus according to claim 2, wherein the controller allows performing of double-sided printing and one-sided printing by the printing unit when attachment of the duplex unit is detected again by the detector after the error screen is displayed.

4. The image forming apparatus according to claim 1, wherein the controller allows performing of one-sided printing while inhibiting performing of double-sided printing when a user performs a predetermined operation in a state where double-sided printing and one-sided printing by the printing unit is inhibited.

5. The image forming apparatus according to claim 1, wherein the detector detects attachment of the duplex unit at least at start-up of the image forming apparatus, and the controller stores the information in the storage unit if the detector detects the attachment.

6. The image forming apparatus according to claim 1, wherein the storage unit stores the information from when attachment of the duplex unit is detected by the detector until when a power source of the image forming apparatus is turned off.

7. The image forming apparatus according to claim 1, wherein the duplex unit includes at least a part of a sheet conveying unit used when double-sided printing is performed.

8. The image forming apparatus according to claim 1, wherein at least one conveying roller among a plurality of conveying rollers provided in the image forming apparatus is driven by a drive source included in the duplex unit when the duplex unit is attached to the image forming apparatus.

9. The image forming apparatus according to claim 1, further comprising:
   a switching unit configured to switch a drive source of a sheet conveying system from a first drive source built in the image forming apparatus to a second drive source built in the duplex unit according to a mechanical attachment of the duplex unit,
   wherein the printing unit drives the first drive source based on a detection by the detector that the duplex unit is not attached, in order to perform one-sided printing.

10. The image forming apparatus according to claim 9, wherein the detector detects, by sensing that an electrical connection with the duplex unit is not established, that the duplex unit is not attached even though the duplex unit is mechanically attached to the image forming apparatus.

11. An image forming apparatus configured to perform one-sided printing without attaching a duplex unit and double-sided printing using the duplex unit, comprising:
   a printing unit configured to print an image on a sheet;
   a detector configured to detect whether or not the duplex unit is attached, wherein information corresponding to a first detection that the duplex unit is attached is stored in a storage unit; and
   a display configured to display an error screen based on the information stored in the storage unit and a current detection by the detector that the duplex unit is not attached.

12. The image forming apparatus according to claim 11, wherein the detector detects attachment of the duplex unit at least at start-up of the image forming apparatus, the information being stored in the storage unit according to the detection of the attachment.

13. The image forming apparatus according to claim 11, wherein the storage unit stores the information from when attachment of the duplex unit is detected by detector until when a power source of the image forming apparatus is turned off.

14. The image forming apparatus according to claim 11, wherein the duplex unit includes at least a part of a sheet conveying unit used when double-sided printing is performed.

15. The image forming apparatus according to claim 11, wherein at least one conveying roller among a plurality of conveying rollers provided in the image forming apparatus is driven by a drive source included in the duplex unit when the duplex unit is attached to the image forming apparatus.

16. A control method for an image forming apparatus configured to perform one-sided printing without attaching a duplex unit and double-sided printing using the duplex unit, the method comprising:
   detecting the duplex unit is attached, wherein information corresponding to a first detection that the duplex unit is attached is stored in a storage unit;
   after the first detection, detecting whether or not the duplex unit is attached; and
   inhibiting performing of one-sided printing based on the information stored in the storage unit and the detecting, which is after the first detection, that the duplex unit is not attached.

17. The control method according to claim 16, further comprising:
   switching a drive source of a sheet conveying system from a first drive source built in the image forming apparatus to a second drive source built in the duplex unit according to a mechanical attachment of the duplex unit, and
   controlling the first drive source to drive the sheet conveying system based on a detection that the duplex unit is not attached, in order to perform one-sided printing.

18. The control method according to claim 17, wherein it is detected, by sensing that an electrical connection with the duplex unit is not established, that the duplex unit is not attached even though the duplex unit is mechanically attached to the image forming apparatus.

19. A control method for an image forming apparatus configured to perform one-sided printing without attaching a duplex unit and double-sided printing using the duplex unit, the method comprising:
   detecting the duplex unit is attached, wherein information corresponding to a first detection that the duplex unit is attached is stored in a storage unit;

after the first detection, detecting whether or not the duplex unit is attached; and displaying an error screen based on the information stored in the storage unit and the detecting, which is after the first detection, that the duplex unit is not attached.

20. A non-transitory computer-readable storage medium storing a program for causing a computer to execute a control method for an image forming apparatus configured to perform one-sided printing without attaching a duplex unit and double-sided printing using the duplex unit, the method comprising:

detecting the duplex unit is attached, wherein information corresponding to a first detection that the duplex unit is attached is stored in a storage unit;

after the first detection, detecting whether or not the duplex unit is attached; and inhibiting performing of one-sided printing based on the information stored in the storage unit and the detecting, which is after the first detection, that the duplex unit is not attached.

21. A non-transitory computer-readable storage medium storing a program for causing a computer to execute a control method for an image forming apparatus configured to perform one-sided printing without attaching a duplex unit and double-sided printing using the duplex unit, the method comprising:

detecting the duplex unit is attached, wherein information corresponding to a first detection that the duplex unit is attached is stored in a storage unit;

after the first detection, detecting whether or not the duplex unit is attached; and displaying an error screen based on the information stored in the storage unit and the detecting, which is after the first detection, that the duplex unit is not attached.

* * * * *